United States Patent
Chu et al.

(10) Patent No.: US 9,958,732 B2
(45) Date of Patent: May 1, 2018

(54) LIQUID CRYSTAL DISPLAY PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Songnan Chu, Beijing (CN); Kang Xiang, Beijing (CN); Fengzhen Lv, Beijing (CN); Byungcheon Lim, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 1 day.

(21) Appl. No.: 14/408,610

(22) PCT Filed: May 23, 2014

(86) PCT No.: PCT/CN2014/078285
§ 371 (c)(1),
(2) Date: Dec. 17, 2014

(87) PCT Pub. No.: WO2015/085717
PCT Pub. Date: Jun. 18, 2015

(65) Prior Publication Data
US 2015/0346527 A1 Dec. 3, 2015

(30) Foreign Application Priority Data
Dec. 9, 2013 (CN) .......................... 2013 1 0666476

(51) Int. Cl.
*G02F 1/1339* (2006.01)
*G09G 3/36* (2006.01)

(52) U.S. Cl.
CPC ........ *G02F 1/1339* (2013.01); *G02F 1/13394* (2013.01); *G09G 3/36* (2013.01)

(58) Field of Classification Search
CPC ...... G02F 1/1339; G02F 1/13394; G09G 3/36
See application file for complete search history.

(56) References Cited

U.S. PATENT DOCUMENTS 7,924,358 B2 * 4/2011 Shen .................. G02F 1/13394
349/55
2005/0185130 A1 * 8/2005 Oh .................... G02F 1/134363
349/156
(Continued)

FOREIGN PATENT DOCUMENTS

CN 101377592 A 3/2009
CN 202013466 U 10/2011
(Continued)

OTHER PUBLICATIONS

Office Action in Chinese Patent Application No. 201310666476.4, dated Jan. 12, 2016.
(Continued)

*Primary Examiner* — Afroza Chowdhury
(74) *Attorney, Agent, or Firm* — Brooks Kushman P.C.

(57) ABSTRACT

The present disclosure provides a liquid crystal display panel and a display device. A spacer of the liquid crystal display panel includes a connection part and a support part which are formed integrally, and the connection part has a cross section larger than that of the support part in a direction parallel to a first substrate and a second substrate. The connection part is connected to the first substrate and the support part supports the second substrate.

16 Claims, 2 Drawing Sheets

(56) References Cited

U.S. PATENT DOCUMENTS

| | | | |
|---|---|---|---|
| 2005/0190336 A1* | 9/2005 | Chen | G02F 1/13394 |
| | | | 349/155 |
| 2007/0030421 A1* | 2/2007 | Sasaki | G02F 1/133707 |
| | | | 349/96 |
| 2007/0188695 A1* | 8/2007 | Wu | G02F 1/13394 |
| | | | 349/156 |
| 2008/0239214 A1* | 10/2008 | Lee | G02F 1/13338 |
| | | | 349/106 |
| 2009/0237608 A1 | 9/2009 | Shen | |

FOREIGN PATENT DOCUMENTS

| | | |
|---|---|---|
| CN | 102636904 A | 8/2012 |
| CN | 102707483 A | 10/2012 |
| CN | 102998851 A | 3/2013 |
| CN | 103235450 A | 8/2013 |
| CN | 103676336 A | 3/2014 |
| JP | 2005-345521 A | 12/2005 |
| KR | 2007-0072318 A | 7/2007 |

OTHER PUBLICATIONS

Office Action in Chinese Patent Application No. 201310666476.4, dated Aug. 31, 2015.
International Search Report and Written Opinion in PCT International Application No. PCT/CN2014/078285, dated Sep. 24, 2014.
Office Action in Chinese Patent Application No. 201310666476.4, dated Jun. 1, 2016.
Office Action in Chinese Patent Application No. 201310666476.4, dated Dec. 2, 2016.

* cited by examiner

LIQUID CRYSTAL DISPLAY PANEL AND DISPLAY DEVICE

CROSS-REFERENCE TO RELATED APPLICATION

This application is the U.S. national phase of PCT Application No. PCT/CN2014/078285 filed on May 23, 2014, which claims priority to Chinese Patent Application No. 201310666476.4 filed on Dec. 9, 2013, the disclosures of which are incorporated in their entirety by reference herein.

TECHNICAL FIELD

The present disclosure relates to the field of liquid crystal display technology, in particular to a liquid crystal display panel and a display device.

BACKGROUND

Along with the development of the display manufacturing technology, a liquid crystal display (LCD), as a mainstream of the flat-panel display, has gradually replaced a traditional CRT display. It has been widely used in TVs, computers and mobile phones due to its features such as light weight, small volume, radiation-free, excellent energy saving effect and high resolution. During the manufacture of a display panel of the LCD, the design and control of a cell thickness, as one of the pivotal technologies, will directly affect the LCD quality.

As shown in FIG. 1, an existing liquid crystal display panel of the LCD includes an array substrate 10' and a color film substrate 20' arranged opposite to each other to form a cell, and a liquid layer (not shown) arranged between the array substrate 10' and the color film substrate 20'. In the related art, a thickness of the liquid crystal layer (i.e., the cell thickness) is mainly controlled by a spacer (PS) (which is usually formed on the color film substrate 20') arranged between the array substrate 10' and the color film substrate 20'. On the basis of its functionalities, the PS includes a primary PS 1' and an auxiliary PS 2'. A first spacer support region 3' is formed on the array substrate 10' at a position corresponding to the primary PS 1', and a second spacer support region 4' is formed at a position corresponding to the auxiliary PS 2'. Generally, an upper surface of the first spacer support region 3' is located at a position above an upper surface of the second spacer support region 4'. The main PS 1' plays a major role in supporting, and only when an excessive external force is exerted to the liquid crystal display panel, the auxiliary PS 2' play a supporting role.

FIG. 1 shows a traditional design for the PS made of an elastic polymer. The primary PS 1' in FIG. 1 has been compressed somewhat at the time of no external force, and maintains the cell thickness. When a strong external force is repeatedly exerted to the liquid crystal panel, the PS will be compressed at a larger amount, and thus easily broken in the middle and then fall away from the substrate. As a result, an adverse display effect will be achieved, and the quality of the LCD will be seriously affected. Once an excessive external force beyond the tolerance capacity of the PS is exerted to the liquid crystal display panel, an irreversible damage will be caused to the liquid crystal display panel.

In order to overcome these drawbacks, the cross-sectional dimension of the primary PS 1' may be increased so as to increase the external force desired for breaking the PS in the middle. In addition, an area of a lower surface of the primary PS 1' may be increased so as to increase the adhesion thereof to the substrate, thereby to prevent it from falling away from the substrate. However, an increase in the whole cross-sectional dimension of the primary PS 1' will deteriorate the elasticity of the PS, and as a result, the primary PS 1' will lose its ability to adjust the cell thickness.

SUMMARY

An object of the present disclosure is to provide a liquid crystal display panel and a display device, so as to improve the ability of the liquid crystal display panel to withstand an external force exerted thereto and ensure its ability to adjust a cell thickness, thereby to improve the quality of the display device.

In one aspect, the present disclosure provides a liquid crystal display panel, including:
a first substrate and a second substrate arranged opposite to each other; and
a spacer arranged between the first substrate and the second substrate.

The spacer includes a connection part and a support part which are formed integrally. The connection part has a cross section larger than that of the support part in a direction parallel to the first substrate and the second substrate. The connection part is connected to the first substrate, and the support part supports the second substrate.

In another aspect, the present disclosure provides a display device including the above-mentioned liquid crystal display panel.

According to the present disclosure, the spacer of the liquid crystal display panel includes the connection part and the support part which are formed integrally, and the connection part has a cross section larger than that of the support part in a direction parallel to the first substrate and the second substrate. The connection part is connected to the first substrate and the support part supports the second substrate. By increasing a cross-sectional dimension of the connection part, it is able to increase the external force desired for breaking the spacer in the middle and improve the ability of the spacer to withstand the external force. In addition, due to the support part with a smaller cross-sectional dimension, it is able to maintain the elasticity of the spacer and ensure its ability to adjust the cell thickness. Further, due to an increase in a contact area between the spacer and the first substrate, it is able to prevent the spacer from falling away from the first substrate when a large external force is exerted thereto.

BRIEF DESCRIPTION OF THE DRAWINGS

In order to illustrate the technical solutions of the present disclosure or the prior art in a clearer manner, the drawings desired for the present disclosure or the prior art will be briefly described hereinafter. Obviously, the following drawings merely relate to some embodiments of the present disclosure, and based on these drawings, a person skilled in the art may obtain the other drawings without any creative effort.

DETAILED DESCRIPTION

The present disclosure will be described hereinafter in conjunction with the drawings and the embodiments. The following embodiments are for illustrative purposes only, but shall not be used to limit the scope of the present disclosure.

First Embodiment

For a liquid crystal display panel, its cell thickness is mainly controlled by a spacer arranged between an array substrate and a color film substrate. During the actual application, the spacer may include a primary spacer and an auxiliary spacer on the basis of its effects. The primary spacer has been compressed somewhat at the time of no external force and plays a major role in supporting so as to maintain a cell thickness. Only when an excessive external force is exerted to the liquid crystal display panel, the auxiliary spacer plays a supporting role. Because the primary spacer has been compressed somewhat at the time of no external force, when an excessive force is exerted to the liquid crystal display panel, the primary spacer will be compressed at a larger amount, and thus easily broken in the middle and then fall away from the substrate. As a result, an adverse display effect will be achieved, and the quality of the LCD will be seriously affected. By increasing its cross-sectional dimension, it is able to increase the external force desired for breaking the primary spacer in the middle, thereby to improve its ability to withstand the external force. However, an increase in the cross-sectional dimension of the primary spacer will deteriorate its elasticity, and as a result, the primary spacer will lose its ability to adjust the cell thickness.

Figure 1:
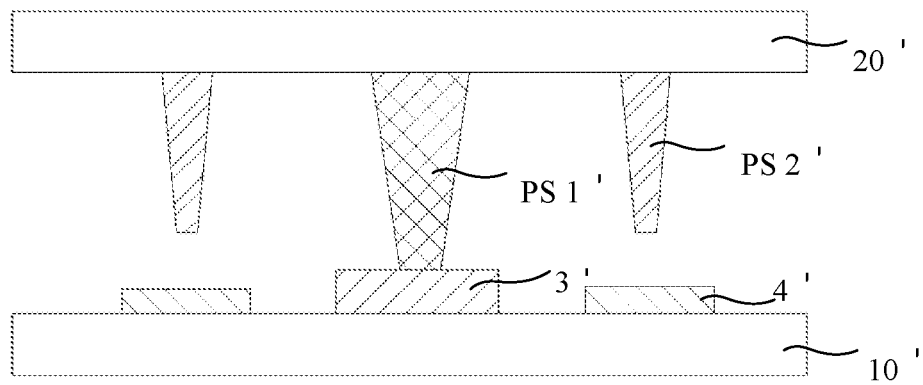
FIG. 1 is a schematic view showing a structure of an existing liquid crystal display panel.
Figure 2:
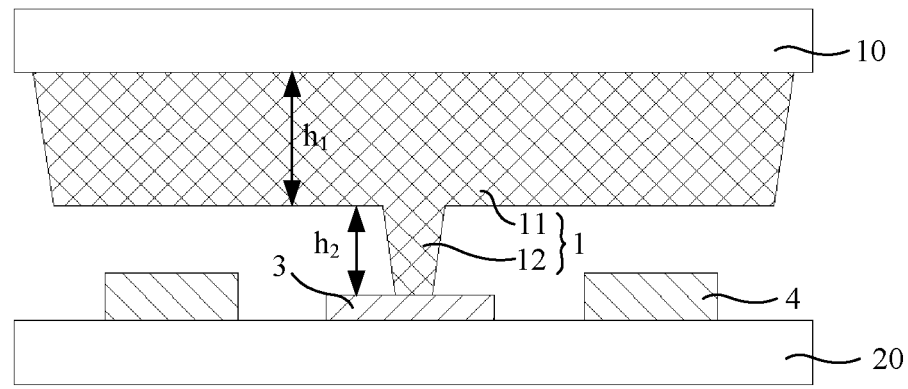
FIG. 2: is a schematic view showing a structure of a liquid crystal display panel according to one embodiment of the present disclosure.

In order to overcome these drawbacks, the present disclosure provides a liquid crystal display panel which, as shown in FIG. 2, includes a first substrate 10 and a second substrate 20 arranged opposite to each other to form a cell, and a spacer 1 arranged between the first substrate 10 and the second substrate 20. A bottom surface of the spacer 1 is connected to the first substrate 10, and a top surface of the spacer 1 supports the second substrate 20, so as to form a space, into which liquid crystal molecules are filled, between the first substrate 10 and the second substrate 20.

The spacer 1 includes a connection part 11 connected to the first substrate 10 and a support part 12 supporting the second substrate 20. The connection part 11 and the support part 12 are formed integrally, and the connection part 11 has a cross section larger than that of the support part 12. The term "cross section" refers to a section in a direction parallel to the first substrate 10 and the second substrate 20. By increasing a cross-sectional dimension of the connection part 11, it is able to increase an external force desired for breaking the spacer 1 in the middle and improve the spacer's ability to withstand the external force. In addition, due to the support part 12 with a smaller cross-sectional dimension, it is able to maintain the elasticity of the spacer 1 and ensure its ability to adjust the cell thickness. Further, due to an increase in a contact area between the spacer 1 and the first substrate 10, it is able to prevent the spacer 1 from falling away from the first substrate 10 at the time of a large external force.

The first substrate 10 may be an array substrate while the second substrate 20 may be a color film substrate, or the first substrate 10 may be a color film substrate while the second substrate 20 may be an array substrate. In other words, the spacer 1 of the liquid crystal display panel may be formed on the array substrate or the color film substrate.

During the manufacture, merely a cross-sectional dimension of a lower portion of the spacer 1 may be increased, so as to form the connection part 11, thereby to improve the ability of the spacer 1 to withstand the external force. Meanwhile, a cross-sectional dimension of an upper portion of the spacer 1 may remain unchanged, so as to form the support part 12, thereby to maintain the elasticity of the spacer 1 and ensure its ability to adjust the cell thickness. Because the spacer 1 of the liquid crystal display panel must be located at a region between pixel units, with the permission of the arrangement space, the larger the cross-sectional dimension of the connection part 11, the better. In addition, an extension direction and a shape of the connection part 11 are not particularly defined.

According to the present disclosure, the spacer of the liquid crystal display panel includes the connection part and the support part which are formed integrally, and the connection part has a cross section larger than that of the support part. The connection part is connected to the first substrate and the support part supports the second substrate. By increasing a cross-sectional dimension of the connection part, it is able to increase the external force desired for breaking the spacer in the middle and improve the ability of the spacer to withstand the external force. In addition, due to the support part with a smaller cross-sectional dimension, it is able to maintain the elasticity of the spacer and ensure its ability to adjust the cell thickness. Further, due to an increase in the contact area between the spacer and the first substrate, it is able to prevent the spacer from falling away from the first substrate at the time of a large external force.

Further, in order to maintain the elasticity of the spacer 1, a height ratio of the support part 12 to the connection part 11 is set to be greater than $1/5$ (i.e., $h2/h1 > 1/5$) in a thickness direction of the first substrate 10 and the second substrate 20.

The larger the ratio $h2/h1$ is, the better the elasticity of the spacer 1 and the better the spacer's ability to adjust the cell thickness are. However, the ratio $h2/h1$ shall not be too large, because the smaller the height h1 of the connection part 11 is, the greater the risk for the spacer 1 to be broken in the middle is when a large external force is exerted to the liquid crystal display panel. In this regard, the height ratio of the support part 12 to the connection part 11 is set to be less than 50 (i.e., $h2/h1 < 50$), so as to reduce the risk for the spacer 1 to be broken in the middle.

Alternatively, the second substrate 20 includes a first support region 3 and a second support region 4, and a top surface of the second support region 4 is located at a position above a top surface of the first support region 3 in the thickness direction of the first substrate 10 and the second substrate 20. The support part 12 corresponds to the first support region 3, and a portion of the connection part 11 arranged outside the support part 12 corresponds to the second support region 4 and serves as an auxiliary support so as to replace an existing auxiliary spacer. When no external force is exerted, merely the support part 12 of the spacer 1 supports the first support region 3, and at this time the support part 12 is in a compressed state. When an excessive external force is exerted to the liquid crystal display panel, the portion of the connection part 11 arranged outside the support part 12 supports the second support region 4, and at this time the portion of the connection part 11 is in a compressed state and serve as an auxiliary support. According to the above-mentioned design, it is able to increase the cross-sectional dimension of the connection part 11 as possible while maintaining the function of the auxiliary spacer, so as to improve the ability of the spacer 1 to withstand the external force.

Figure 3:
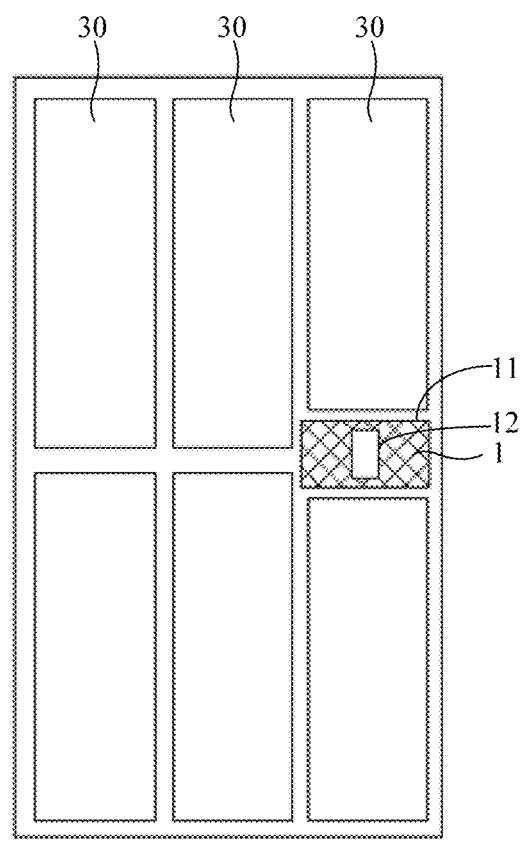
FIG. 3 is schematic view showing the distribution of a spacer in FIG. 2.

In a high-resolution product, a size of the pixel unit becomes smaller and smaller. In order to ensure an aperture ratio, a space where the spacer is accommodated becomes smaller and smaller too. In addition, due to the limit of a process for manufacturing the spacer, defects will easily occur for the spacer with a too small size, thus the design of the spacer for the high-resolution product will be limited. However, according to the above-mentioned design where the connection part 11 of the spacer 1 replaces the existing auxiliary spacer to serve as an auxiliary support, it is able to overcome this limit by reducing the aperture ratio of the individual pixel units 30, thereby to sufficiently support the substrate, as shown in FIG. 3.

In this embodiment, the connection part 11 and the support part 12 of the spacer 1 are formed in a single patterning process, so as to reduce the process complexity. To be specific, the connection part 11 and the support part 12 of the spacer 1 may be formed by an identical film layer or different film layers.

The formation of the spacer 1 in this embodiment will be described hereinafter by taking the connection part 11 and the support part 12 of the spacer 1 formed by the same film layer as an example.

Step a: applying a photoresist onto the film layer.

Step b: exposing and developing the photoresist with a half-tone or half-grayscale mask plate, so as to form a photoresist-half-reserved region corresponding at least to a region where the portion of the connection part 11 arranged outside the support part 12 is located, a photoresist-fully-reserved region corresponding at least to a region where the support part 12 is located, and a photoresist-unreserved region corresponding to the other regions.

Step c: etching off the film layer at the photoresist-unreserved region by a first etching process.

Step d: removing the photoresist at the photoresist-half-reserved region by an ashing process, and etching off a part of the film layer at the photoresist-half-reserved region by a second etching process.

Step e: peeling off the photoresist so as to form the connection part 11 and the support part 12 of the spacer 1.

When the connection part 11 and the support part 12 of the spacer 1 are formed by different film layers, the formation thereof is similar to that mentioned above, and will not be repeated herein. Of course, the connection part 11 and the support part 12 of the spacer 1 may also be formed by two patterning processes, respectively.

Further, when the connection part 11 and the support part 12 of the spacer 1 are formed by different film layers, the connection part 11 may be made of a material with hardness greater than that of the support part 12, so as to further increase the external force desired for breaking the spacer 1 in the middle, thereby to improve the ability of the spacer 1 to withstand the external force.

Further, when the connection part 11 and the support part 12 of the spacer 1 are formed by different film layers, the connection part 11 may be made of a material with elasticity greater than that of the support part 12, so as to increase the elasticity of the spacer 1, thereby to improve the ability of the spacer 1 to adjust the cell thickness.

Second Embodiment

The present disclosure further provides a display device including the liquid crystal display panel in the first embodiment. Because the ability of the liquid crystal display panel to withstand the external force and to adjust the cell thickness is improved, it is able to improve the quality of the display device.

The above are merely the preferred embodiments of the present disclosure. It should be appreciated that, a person skilled in the art may make further improvements and replacements without departing from the principle of the present disclosure, and these improvements and replacements shall also fall thin the scope of the present disclosure.

What is claimed is:

1. A liquid crystal display panel, comprising:
a first substrate and a second substrate arranged opposite to each other; and
a spacer arranged between the first substrate and the second substrate,
wherein the spacer includes a connection part and a support part which are formed integrally, a cross section of the connection part in a direction parallel to the first substrate and the second substrate is larger than a cross section of the support part in the direction parallel to the first substrate and the second substrate, and
the connection part is connected to the first substrate, and the support part supports the second substrate;
wherein the connection part is not detachable from the support part, and a height ratio of the support part to the connection part is greater than ⅕ in a thickness direction of the first substrate and the second substrate;
wherein the second substrate is provided with a first support region and a second support region, and the second support region is higher than the first support region,
the support part corresponds to the first support region and contacts the first support region, and
the second support region corresponds to a portion of the connection part arranged outside the support part, so that the connection part serves an auxiliary support.

2. The liquid crystal display panel according to claim 1, wherein the height ratio of the support part to the connection part is less than 50.

3. The liquid crystal display panel according to claim 1, wherein the connection part and the support part are formed by a single patterning process.

4. The liquid crystal display panel according to claim 1, wherein the connection part and the support part are formed by a single patterning process.

5. The liquid crystal display panel according to claim 1, wherein the connection part and the support part are formed by a single patterning process.

6. A display device comprising the liquid crystal display panel according to claim 1.

7. The liquid crystal display panel according to claim 1, wherein an orthographic projection of the support part onto the first substrate is completely located within an orthographic projection of the connection part onto the first substrate.

8. The liquid crystal display panel according to claim 2, wherein the connection part and the support part are formed by a single patterning process.

9. The liquid crystal display panel according to claim 3, wherein the connection part and the support part are formed by an identical film layer.

10. The liquid crystal display panel according to claim 3, wherein the connection part and the support part are formed by different film layers, and
the connection part is made of a material with hardness greater than that of the support part.

11. The liquid crystal display panel according to claim 3, wherein the connection part and the support part are formed by different film layers, and
the support part is made of a material with elasticity greater than that of the connection part.

12. The display device according to claim 6, wherein the height ratio of the support part to the connection part is less than 50.

13. The display device according to claim 6, wherein the connection part and the support part are formed by a single patterning process.

14. The display device according to claim 13, wherein the connection part and the support part are formed by an identical film layer.

15. The display device according to claim 13, wherein the connection part and the support part are formed by different film layers, and the connection part is made of a material with hardness greater than that of the support part.

16. The display device according to claim 13, wherein the connection part and the support part are formed by different film layers, and the support part is made of a material with elasticity greater than that of the connection part.

\* \* \* \* \*